United States Patent [19]
Broyden et al.

[11] Patent Number: 4,635,903
[45] Date of Patent: Jan. 13, 1987

[54] ELECTRIC HOIST PENDANT CONTROL SWITCH ARRANGEMENT

[75] Inventors: Robert H. Broyden, Bristol, Va.; R. Paul Benton, North Tonawanda; Allen E. Eldridge, Tonawanda, both of N.Y.

[73] Assignee: Columbus McKinnon Corporation, Amherst, N.Y.

[21] Appl. No.: 760,268

[22] Filed: Jul. 29, 1985

[51] Int. Cl.⁴ .................... A44B 13/00; B66D 1/12; F16G 15/00
[52] U.S. Cl. .................... 254/362; 24/69 WT; 24/116 R; 24/230.5 R; 59/93
[58] Field of Search ............ 254/264, 266, 292, 316, 254/340, 362; 24/68 CT, 69 WT, 116 R, 230.5 R, 514, 573; 59/86, 93; 248/200, 317

[56] References Cited
U.S. PATENT DOCUMENTS

| | | | |
|---|---|---|---|
| 1,767,451 | 6/1930 | Hedge | 24/230.5 R X |
| 1,870,385 | 8/1932 | Seaman et al. | 254/362 X |
| 2,073,349 | 3/1937 | Nampa | 24/230.5 R X |
| 2,371,352 | 3/1945 | Parker et al. | 254/362 X |
| 2,770,438 | 11/1956 | Zingone | 248/317 |
| 2,874,989 | 2/1959 | Reynolds | 254/380 X |
| 3,125,200 | 3/1964 | Kaman | 254/380 X |
| 3,237,780 | 3/1966 | Burnett | 254/380 X |
| 3,432,145 | 3/1969 | Mudge | 254/362 X |
| 3,441,301 | 4/1969 | Cale | 59/93 X |
| 3,858,845 | 1/1975 | Grote et al. | 254/266 |
| 4,026,526 | 5/1977 | Messerschmidt et al. | 254/264 |
| 4,076,433 | 2/1978 | Halopoff | 59/86 X |
| 4,320,620 | 3/1982 | Rieger et al. | 59/93 |

FOREIGN PATENT DOCUMENTS

| | | | |
|---|---|---|---|
| 1283041 | 11/1968 | Fed. Rep. of Germany | 24/116 R |
| 2849912 | 7/1980 | Fed. Rep. of Germany | 254/362 |

*Primary Examiner*—Stuart S. Levy
*Assistant Examiner*—Joseph J. Hail, III
*Attorney, Agent, or Firm*—Bean, Kauffman & Bean

[57] ABSTRACT

There is disclosed a pendant control arrangement for overhead electric hoists featuring a helically wound elastically memorized insulative cord enclosing a plurality of electrical conductors for attachments at their opposite ends to terminals in the hoist motor and in the pendant control switches. This coiled cord encloses a straight line strain relief cable or the like which is of a length equal to the anticipated length required to support the pendant switch control panel at proper elevation below the electric hoist, and simply mechanically connects at its opposite ends to said motor and said control panel. Thus, changes in the distance required between the hoist motor and the control panel are more readily accommodated by reason of the mechanical connections of the relief cable, while leaving the electrical connections of the control cord conductors undisturbed.

4 Claims, 8 Drawing Figures

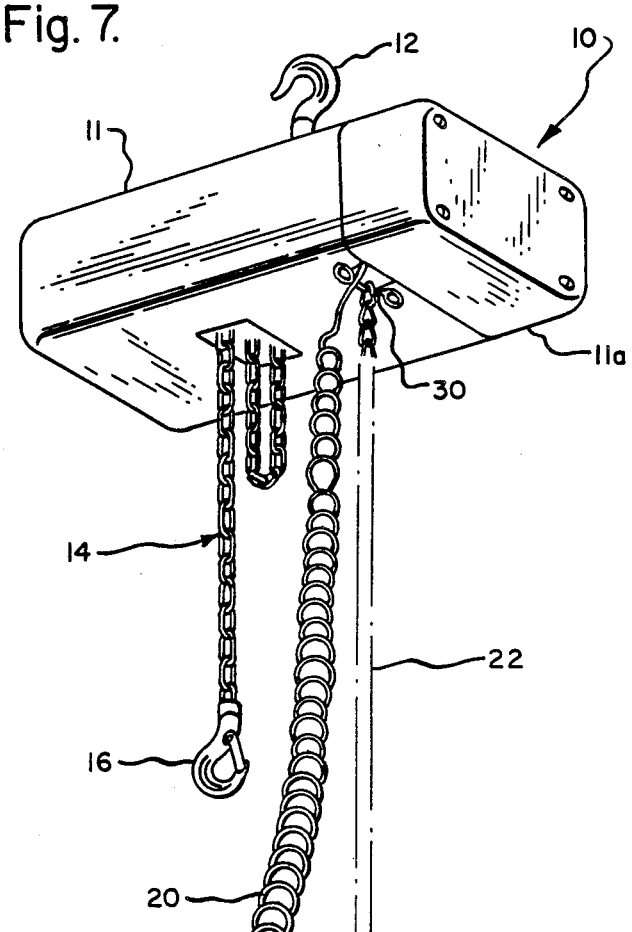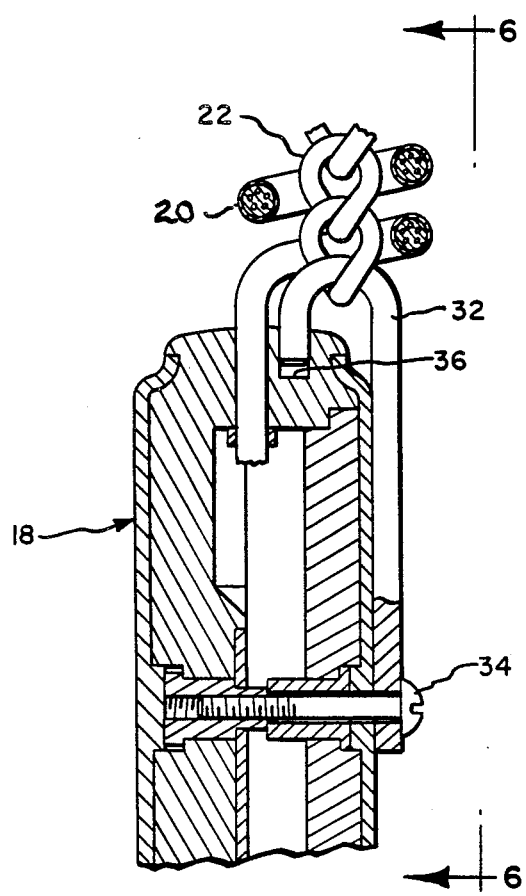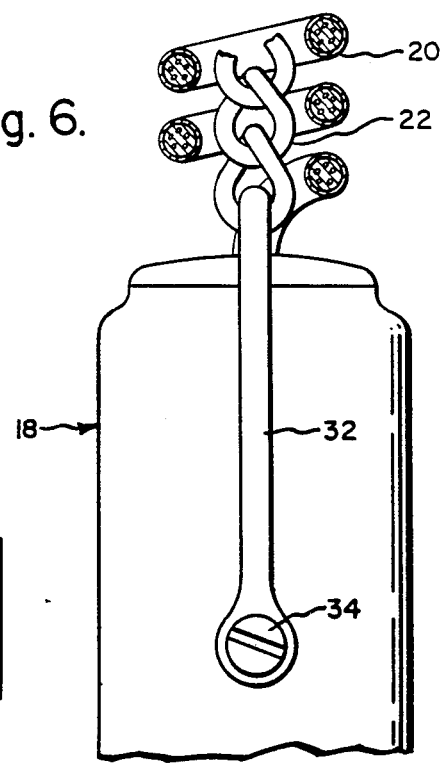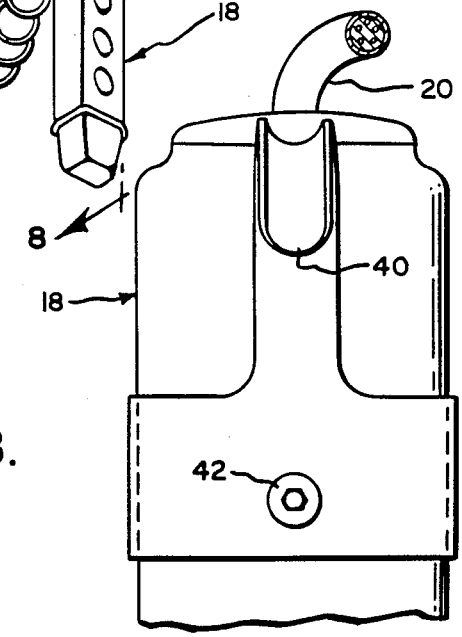

ELECTRIC HOIST PENDANT CONTROL SWITCH ARRANGEMENT

BACKGROUND AND OBJECTS OF THE INVENTION

This invention relates to electrical hoists or the like, and more particularly to dependent type electrical switch control means therefor. Electrically operated hoists are typically installed at various heights relative to the surfaces upon which the hoist operators stand. Therefore, when initially installed the electrical "cord" (which typically comprises a plurality of individually insulated conductors) as well as the associated strain relief chain or cable extending between the pendant switch and the hoist, are required to be of any one of a variety of lengths in order to support the pendant switch at a proper elevation for efficient use by the operator. Also, in many cases a previously installed hoist may be required to be moved from time to time and reinstalled for operation by different personnel at locations involving different heights relative to the operational floor level. Thus, provision must be made for adjustments of the length of the hoist control cord as well as its accompanying strain relief device.

On the job changes in the length of the chain or wire or twisted wire cable comprising the strain relief device are typically made such as by substituting a new chain or the like for the original; or chopping the original to a shorter length, or adding a piece to its original length such as may be required. Or, the strain relief device may deliberately be provided initially of a length anticipated to be longer than ever required. Then, upon installation at any given site, the pendant switch is hooked into any appropriate link or position on the strain relief device, and the excess length may be looped upwardly and tied about the upper body portion of the device. Such adjustments are easily and readily made because such strain relief devices need only be mechanically "hooked" to both the housing of the hoist and to the dependent hoist operating control panel. However, incidental to any such transition, it has heretofore been also necessary to first separately electrically disconnect both ends of each conductor in the originally employed control cord from the terminals at the hoist as well as in the pendant switch; and then to connect both ends of each conductor in the replacement cord to the terminals in the hoist and in the switch panel. Such operations may, of course, be reliably performed only by specialized personnel, and are time consuming and expensive.

It is a primary object of the present invention to provide for control systems as aforesaid an improved combination of hoist control cord and strain relief device, eliminating the aforesaid disadvantages of the prior art.

Another object is to provide an improved combination hoist control cord and strain relief device which avoids the need for electrically disconnecting and reconnecting hoist control cord conductors to hoist motor and pendant switch panel terminals when readapting a previously installed hoist to meet any of the aforesaid problems. Other objects and advantages of the invention will appear from the specification hereinafter.

BRIEF DESCRIPTION OF THE DRAWING

FIG. 5 is an enlarged scale fragmentary sectional view taken as along line 5—5 of FIG. 1;

FIG. 6 is a view taken as along line 6—6 of FIG. 5;

FIG. 7 is a view corresponding to FIG. 1, but illustrates another relative arrangement of an extensible electrical cord and its strain relief cable such as lacks the operating conveniences and advantages of the present invention; and FIG. 8 is a view corresponding to FIG. 6, but showing a different form of hook arrangement for mechanically connecting the control switch panel to the strain relief cable.

DETAILED SPECIFICATION

Figure 1:
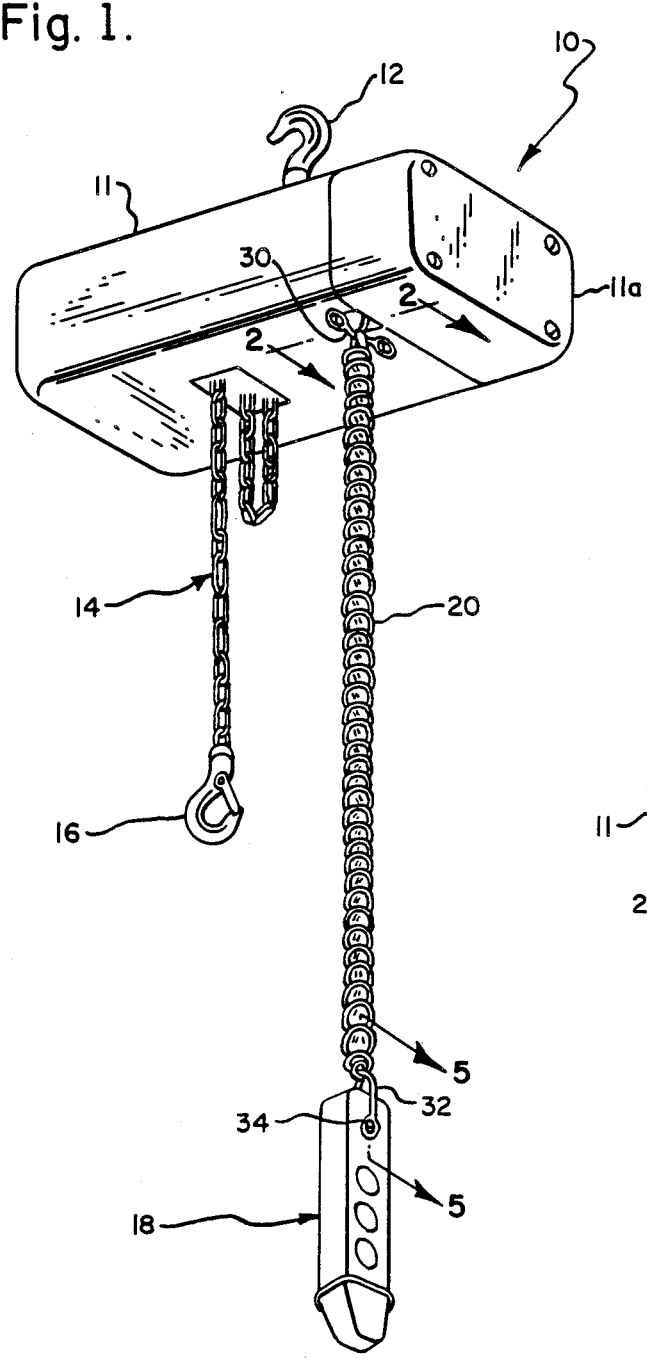
FIG. 1 is a perspective view of a typical hoist installation wherein the hoist electrical control switch unit is suspended therebelow by means of one preferred form of electrical cord and strain cable arrangement of the present invention.

As shown at FIGS. 1–6, one preferred best mode embodiment of the invention may be employed in combination with any type electrical hoist such as is designated generally by numeral 10 (FIG. 1). Such hoists are typically enclosed within separable housing parts such as shown at 11 and 11a, and are suspended from higher elevations by means of support hooks as shown at 12. The load lift chain from such a hoist is illustrated at 14, and terminates in a so-called load "grab hook" as shown at 16.

Also, such hoists are typically provided with operating control devices of the suspended switch panel type such as is shown at 18, which are electrically coupled by means of a plurality of individually insulated electrical conductors combined in what is known in the industry as the hoist control electrical "cord" as shown at 20. In the case of the prior art, such control "cords" as have been furnished to the industry are of lengths equal to those of the accompanying strain relief devices for parallel suspension from the hoist into connection with the control panel 18.

However, as distinguished from the prior art, in the case of the present invention as shown at FIG. 1, the control "cord" is initially supplied in the form of a tightly helically wound "cord" of excess length such as is illustrated at 20, and which envelopes the pendant strain relief chain of links extending between the hoist 10 and the pendant control switch 18. Suitable "cords" for such purposes may comprise a plurality of individually insulated conductors unitized in a matrix of an uncured rubber-like or polyurethane type material, and then tightly wound in helical fashion about a mandrel. Then, upon baking or otherwise "curing" the matrix, the cord acquires the desired "elastic memory" of helically wound columnar configuration. Alternatively, the conductors may be individually insulated by a suitable uncured material; twisted into "cable" form; helically wound upon a mandrel or the like; and then cured. In either case, the cord should linearly measure more than the length of the strain relief device.

By virtue of such a relative arrangement of hoist; electrical control panel; control cord and pendant strain relief device, any prescribed installation of the hoist is in accordance with the invention readily amenable to modification to suit operating personnel of different physiques and/or reinstallations at different elevations.

In such cases, only the pendant strain relief device, such as may be either of the linked chain or straight wire or cable type, need be either replaced, shortened or lengthened; and this is easily accomplished by reason of its simple mechanical interconnections to the hoist and to the control panel. Incidental to this, the control "cord" of the system need not be disturbed because it readily contracts or extends to adapt itself to any such initial installation or to other reinstallation requirements. For example, helically wound "coil cords" as aforesaid measuring 28 inches when untensioned have been found to comfortably extend to as much as 10 feet in length.

Furthermore, it is particularly noteworthy that enclosure of the strain relief device by the helically wound portion of the electrical cord provides another important advantage in that the relatively limp portion of the cord is itself thereby maintained at all times in snug straight line integrated relation with the strain relief device. This prevents any slack portion of the cord from dangling limply alongside the control panel (as shown at FIG. 7) such as would interfere with the operator's handling of the control panel, as well as tending to become entangled with objects environmental to the hoist operator's station.

Figure 2:
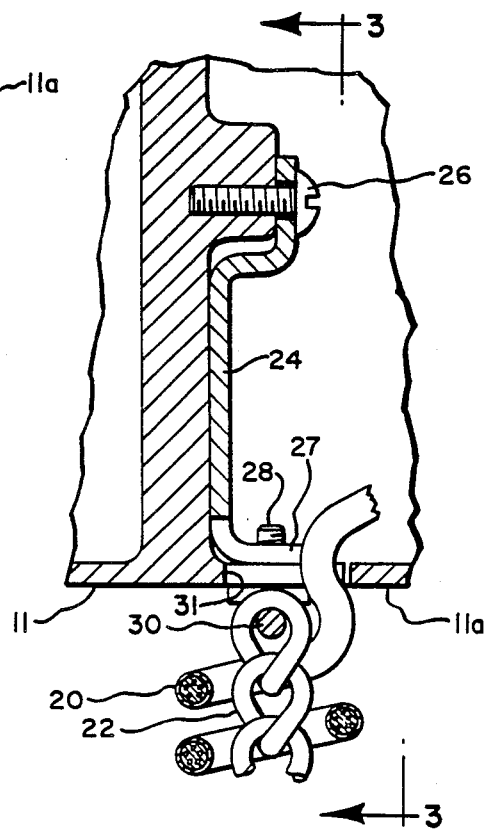
FIG. 2 is an enlarged scale fragmentary sectional view taken such as along line 2—2 of FIG. 1.
Figure 3:
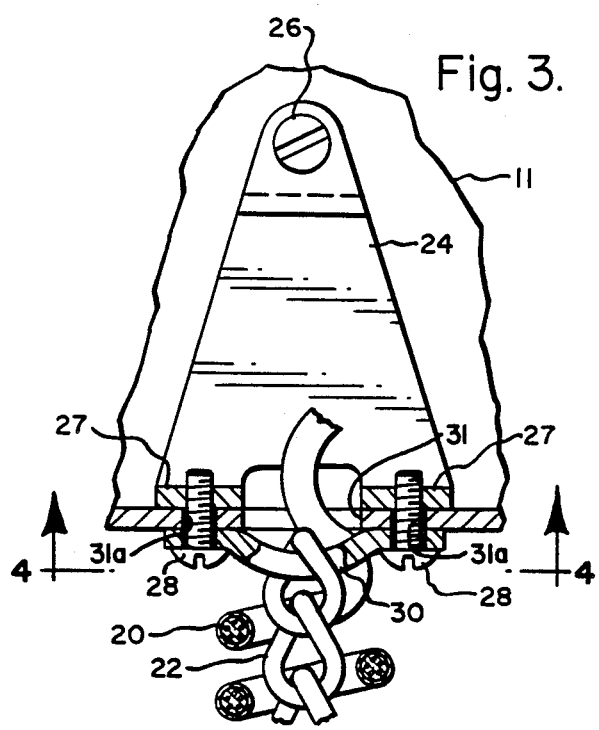
FIG. 3 is a fragmentary view taken as along line 3—3 of FIG. 2.
Figure 4:
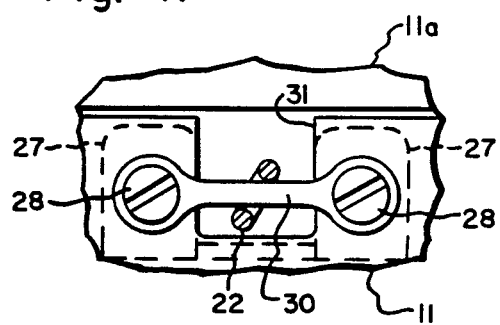
FIG. 4 is a fragmentary view taken as along line 4—4 of FIG. 3.

FIGS. 2, 3 and 4 illustrate by way of example at the hoist a suitable mechanical type connection for the strain relief device. As shown, this may comprise a clamp plate 24 which is anchored interiorly of the hoist housing 10 as by means of a machine screw 26. The clamp is formed with a bifurcated flanged foot portion 27 underneath which is mounted by means of screws 28,28 a saddle bar 30 upon which hangs the uppermost link 22 of the strain relief chain. As will be apparent from FIGS. 1–4, housing part 11 is formed with an opening 31 for permitting passage of cord 20 outwardly of housing 11 and a pair of adjacently disposed openings 31a,31a for receiving screws 28,28. Upon tightening of screws 28,28, saddle bar 30 is removably fixed to clamp plate 24 and the wall of housing part 11 is clamped between the saddle bar and the foot portion of the clamp plate. FIGS. 5 and 6 illustrate by way of example at the pendant control panel 18 another suitable mechanical type connection for the relief chain. As shown, a simple hook device 32 is fastened alongside the control panel by means of a machine screw 34 and the upper end of the hook is shaped to dip into a vertical bore 36 formed in the upper end of the panel 18. Thus, the hook 32 is stabilized relative to the panel, but is easily removable to permit exchanges of load relief chains of different lengths. FIG. 8 shows another suitable device for hooking the control panel to the strain relief cable.

FIG. 7 illustrates another hoist control cord and strain relief device arrangement avoiding the necessity of changing the control cord incidental to each change of the strain relief device. In this case, the control cord is again of the helically wound elastic memory type, whereby it is readily adaptable to any required hoist-to-control panel height and the ends of the relief chain need only be equipped with open links such as shown at 38 for slip-fitted connection into hook-shaped members 40 or the like such as is shown fastened to the control panel 18 as by means of screws 42. However, it is apparent that in this case the control cord is not positionally restrained by the strain relief cable, and that the relatively limp control cord is in position to interfere with the operator's handling of the control panel, and is undesirably vulnerable to entanglements with nearby objects as the operator maneuvers the load being handled by the hoist.

Thus, it is to be understood that hoist control installations in accordance with the present invention are readily amenable to modifications as above referred to and otherwise provide important advantages over the prior art. By way of further example, an in-line production facility requiring a battery of electrical hoists would need to purchase only one set of electrical cords of the present invention such as are of such length as to accommodate the shortest as well as the longest distances between the hoists and their pendant switch control panels anticipated to be required to accommodate any future reinstallations. Thus, not only does the invention effect an initial cost reduction, but it also provides a system permitting modifications at reduced costs to suit a large variety of reinstallation conditions.

What is claimed is:

1. An electric hoist and pendant switch control system therefor wherein said hoist includes an electric motor housing and means for suspending same at an elevation;

an electric switch control panel;

a flexible strain relief device in the form of a link chain mechanically connected at an upper portion thereof to said motor housing and at a lower portion thereof to said panel for suspending said panel at an elevation below that of said motor housing;

said upper portion of said link chain being connected to said motor housing by a saddle bar passed through a link of said link chain adjacent said upper portion, a clamp plate fixed to said motor housing and screws for removably attaching opposite ends of said saddle bar to said clamp plate;

said lower portion of said link chain being connected to said panel by a hook attached to said panel and removably received within a link of said link chain adjacent said lower portion;

and an electric cord comprising a plurality of conductors electrically connected at each of their ends with terminals in said motor housing and in said panel, respectively;

said conductors being matrixed in an initially uncured but curable elastic material and then helically wound into hollow columnar form and then cured, whereby said cord is of a linear length greater than that of said link chain and at least a portion of said cord tends by way of elastic memory to retain a helically wound columnar form;

said link chain is disposed to extend through the hollow of the helically wound columnar portion of said cord, said link chain being unconnected to said cord throughout the lengths thereof;

whereby said pendant switch control system may be modified to suit different distances required between said motor housing and said control panel by changing the length of said link chain between said motor housing and said control panel while leaving the terminal connections of said conductors undisturbed.

2. An electric hoist and pendant switch control system according to claim 1 wherein said panel has an upper end provided with a vertical bore, said hook has one end removably fixed to said panel and an opposite end removably received within said vertical bore.

3. An electric hoist and pendant switch control system according to claim 1 wherein said motor housing has an opening through which said cord extends and a pair of adjacent openings, said clamp plate is fixed within said motor housing and said screws extend through said saddle bar and said pair of adjacent openings into said clamp plate.

4. An electric hoist and pendant switch control system according to claim 3 wherein said panel has an upper end provided with a vertical bore, said hook has one end removably fixed to said panel and an opposite end removably received within said vertical bore.

* * * * *